United States Patent
Minagawa

(10) Patent No.: US 10,669,920 B2
(45) Date of Patent: Jun. 2, 2020

(54) COOLING CONTROL SYSTEM FOR WORKING MACHINE AND THE WORKING MACHINE

(71) Applicant: KUBOTA CORPORATION, Osaka-shi, Osaka (JP)

(72) Inventor: Nozomu Minagawa, Sakai (JP)

(73) Assignee: KUBOTA CORPORATION, Osaka-Shi (JP)

(*) Notice: Subject to any disclaimer, the term of this patent is extended or adjusted under 35 U.S.C. 154(b) by 169 days.

(21) Appl. No.: 16/015,968

(22) Filed: Jun. 22, 2018

(65) Prior Publication Data
US 2018/0371980 A1 Dec. 27, 2018

(30) Foreign Application Priority Data

Jun. 26, 2017 (JP) .................... 2017-124361
Jun. 26, 2017 (JP) .................... 2017-124362

(51) Int. Cl.
*B60K 11/06* (2006.01)
*E02F 9/24* (2006.01)
(Continued)

(52) U.S. Cl.
CPC ............ *F01P 7/042* (2013.01); *E02F 9/0866* (2013.01); *E02F 9/2025* (2013.01); *E02F 9/2062* (2013.01); *E02F 9/24* (2013.01); *F01P 5/04* (2013.01); *F16D 35/027* (2013.01); *B60K 11/06* (2013.01); *E02F 3/34* (2013.01); *F16D 2500/10468* (2013.01); *F16D 2500/702* (2013.01)

(58) Field of Classification Search
CPC .. F01P 7/042; F01P 5/04; E02F 9/0866; E02F 9/2025; E02F 9/2062; E02F 9/24; E02F 3/34; F16D 35/027; B60K 11/06
See application file for complete search history.

(56) References Cited

U.S. PATENT DOCUMENTS

| | | | | |
|---|---|---|---|---|
| 4,828,088 A | * | 5/1989 | Mohan | F16D 35/024 192/103 F |
| 2003/0079952 A1 | * | 5/2003 | Smith | F16D 35/02 192/21.5 |

(Continued)

FOREIGN PATENT DOCUMENTS

JP 2007-255216 A 10/2007

*Primary Examiner* — Bryan A Evans
(74) *Attorney, Agent, or Firm* — Birch, Stewart, Kolasch & Birch, LLP

(57) ABSTRACT

A cooling control system includes a prime mover, a fan to be rotated under rotational power of an output shaft of the prime mover, a housing to which the fan is attached, a rotor to be rotated under rotational power of the prime mover, the rotor and the housing, under the agency of a fluid, rotating together, a fluid setting circuit to determine an injection quantity of the fluid to be introduced into the gap, a fan rotation detection device to detect a fan actual rotation speed, a target rotation obtaining circuit to obtain a fan target rotation speed. The integral controlling circuit does not execute the integral control with a difference between the fan actual rotation speed and a fan target rotation speed being greater than or equal to a threshold, and executes the integral control with the difference being less than the threshold.

11 Claims, 19 Drawing Sheets

(51) Int. Cl.
    *F01P 7/04*     (2006.01)
    *F16D 35/02*     (2006.01)
    *E02F 9/20*     (2006.01)
    *F01P 5/04*     (2006.01)
    *E02F 9/08*     (2006.01)
    *E02F 3/34*     (2006.01)

(56) References Cited

U.S. PATENT DOCUMENTS

2007/0068762 A1*   3/2007   Bhat ................ F01P 7/042
                                                                              192/58.61
2017/0152789 A1*   6/2017   Benevelli ............ F01P 5/04

* cited by examiner

FIG.11A

| P gain map | | Engine actual rev. speed E1 | | |
|---|---|---|---|---|
| | | a | b | c |
| Fan target rotation speed F1 | A | PAa | PAb | PAc |
| | B | PBa | PBb | PBc |
| | C | PCa | PCb | PCc |
| | D | PDa | PDb | PDc |
| | E | PEa | PEb | PEc |
| | F | PFa | PFb | PFc |
| | G | PGa | PGb | PGc |
| | H | PHa | PHb | PHc |

※ All gains are positive constants

FIG.11B

| I gain map | | Engine actual rev. speed E1 | | |
|---|---|---|---|---|
| | | a | b | c |
| Fan target rotation speed F1 | A | IAa | IAb | IAc |
| | B | IBa | IBb | IBc |
| | C | ICa | ICb | ICc |
| | D | IDa | IDb | IDc |
| | E | IEa | IEb | IEc |
| | F | IFa | IFb | IFc |
| | G | IGa | IGb | IGc |
| | H | IHa | IHb | IHc |

※ All gains are positive constants

FIG.11C

| D gain map | | Engine actual rev. speed E1 | | |
|---|---|---|---|---|
| | | a | b | c |
| Fan target rotation speed F1 | A | DAa | DAb | DAc |
| | B | DBa | DBb | DBc |
| | C | DCa | DCb | DCc |
| | D | DDa | DDb | DDc |
| | E | DEa | DEb | DEc |
| | F | DFa | DFb | DFc |
| | G | DGa | DGb | DGc |
| | H | DHa | DHb | DHc |

※ All gains are positive constants

US 10,669,920 B2

COOLING CONTROL SYSTEM FOR WORKING MACHINE AND THE WORKING MACHINE

CROSS-REFERENCE TO RELATED APPLICATIONS

The present application claims priority under 35 U.S.C. § 119 to Japanese Patent Application No. 2017-124361, filed Jun. 26, 2017, and to Japanese Patent Application No. 2017-124362, filed Jun. 26, 2017. The contents of these applications are incorporated herein by reference in their entirety.

FIELD OF THE INVENTION

The present invention relates to a cooling control system for a working machine and to the working machine.

DISCUSSION OF THE BACKGROUND

For a working machine cooling control system to date, Japanese Unexamined Patent Application Publication No. 2007-255216 is known. The working machine cooling control system of Japanese Unexamined Patent Application Publication No. 2007-255216 is furnished with a control device that controls the rpm of a cooling fan that introduces external air as a cooling blast for cooling a cooling fluid, wherein the system calculates the difference between a fluid-temperature sensor that senses the fluid temperature and an atmospheric temperature sensor that senses the temperature of the external air, and sets a target rpm for the cooling fan corresponding to the size of the difference.

SUMMARY OF THE INVENTION

A cooling control system for a working machine, includes a prime mover having an output shaft, a fan to be rotated under rotational power of the output shaft, a housing to which the fan is attached, a rotor to be rotated under rotational power of the output shaft, the rotor and the housing, under the agency of a fluid introduced into a gap formed between the rotor and the housing, rotating together, a fluid setting circuit to determine an injection quantity of the fluid to be introduced into the gap, a fan rotation detection device to detect an actual rotation speed of the fan, a target rotation obtaining circuit to obtain a target rotation speed of the fan, a proportional controlling circuit to execute proportional control with respect to a difference between the actual rotation speed and the target rotation speed, an integral controlling circuit to execute integral control with respect to the difference, and a differential controlling circuit to execute differential control with respect to the difference. The integral controlling circuit does not execute the integral control with the difference being greater than or equal to a threshold, and executes the integral control with the difference being less than the threshold.

A cooling control system for a working machine, includes a prime mover having an output shaft, a fan to rotate under rotational power of the output shaft, a housing on which the fan is attached, a rotor to rotate under rotational power of the output shaft, the rotor and the housing, under the agency of a fluid introduced into a gap formed between the rotor and the housing, rotating together, a fluid setting circuit to determine an introduction quantity of the fluid to be introduced into the gap, a fan rotation detection device to detect an actual rotation speed of the fan, a target rotation obtaining circuit to obtain a target rotation speed of the fan, a proportional controlling circuit to carry out proportional control with respect to a difference between the actual rotation speed and the target rotation speed, an integral control circuit to carry out integral control with respect to the difference, a differential control circuit to carry out differential control with respect to the difference, and a gain setting circuit to set a control gain for any one of the proportional control, the integral control, and the differential control, based on an actual revolution speed of the prime mover.

A working machine includes the cooling control system mentioned above.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 11A is a view illustrating an example of a proportional gain map used in the gain change processing in the cooling control system according to the embodiment;

FIG. 11B is a view illustrating an example of an integral gain map used in the gain change processing in the cooling control system according to the embodiment;

FIG. 11C is a view illustrating an example of a differential gain map used in the gain change processing in the cooling control system according to the embodiment.

DESCRIPTION OF THE EMBODIMENTS

Figure 1:
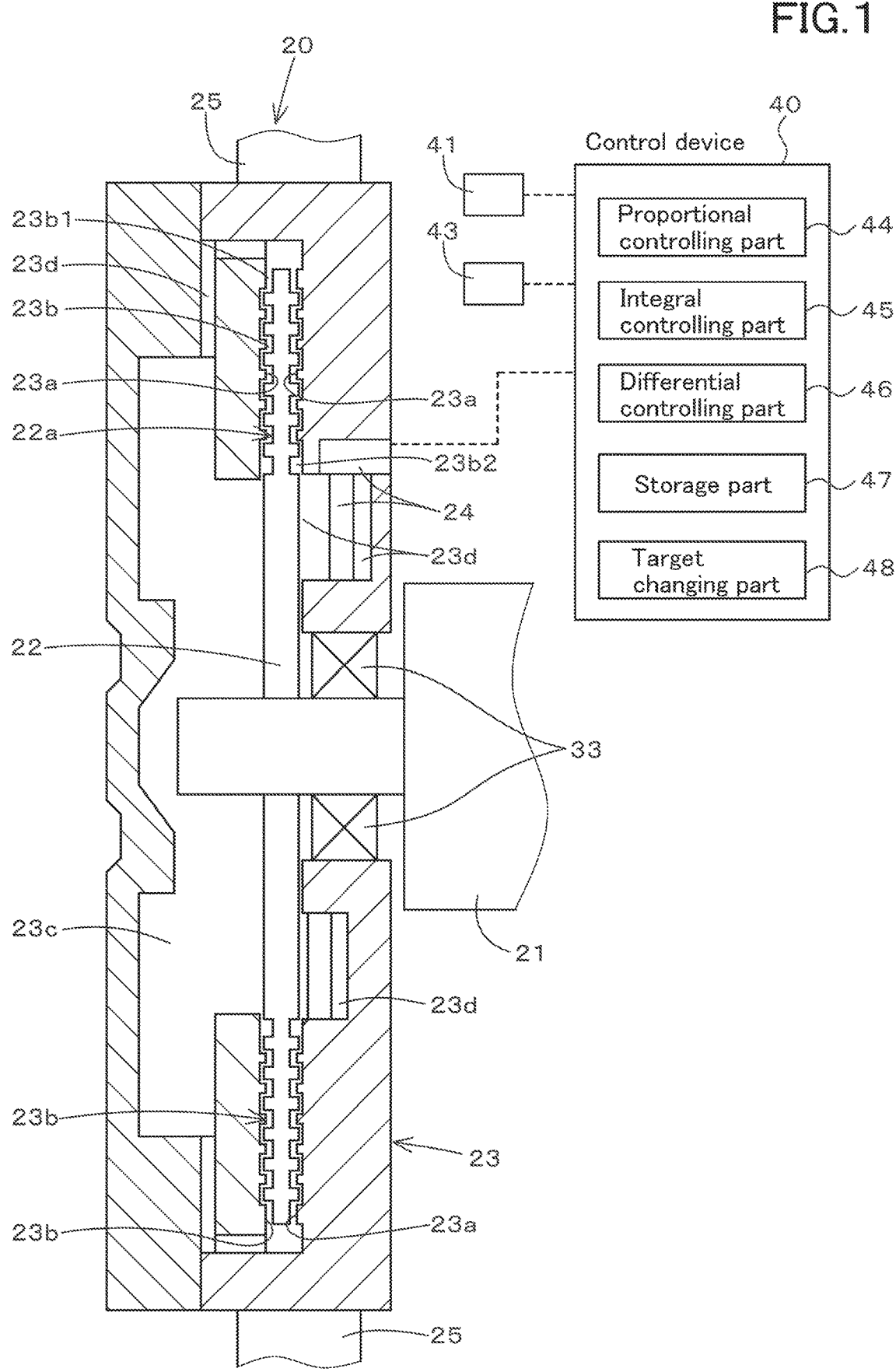
FIG. 1 is a view illustrating a working machine cooling control system.

The embodiments will now be described with reference to the accompanying drawings, wherein like reference numerals designate corresponding or identical elements throughout the various drawings. The drawings are to be viewed in an orientation in which the reference numerals are viewed correctly.

In the following, an explanation of suitable modes of embodying a working machine cooling control system—and a working machine furnished with the cooling control system—involving the present invention will be made while referring to the appropriate drawings.

(First Embodiment)

Figure 6:
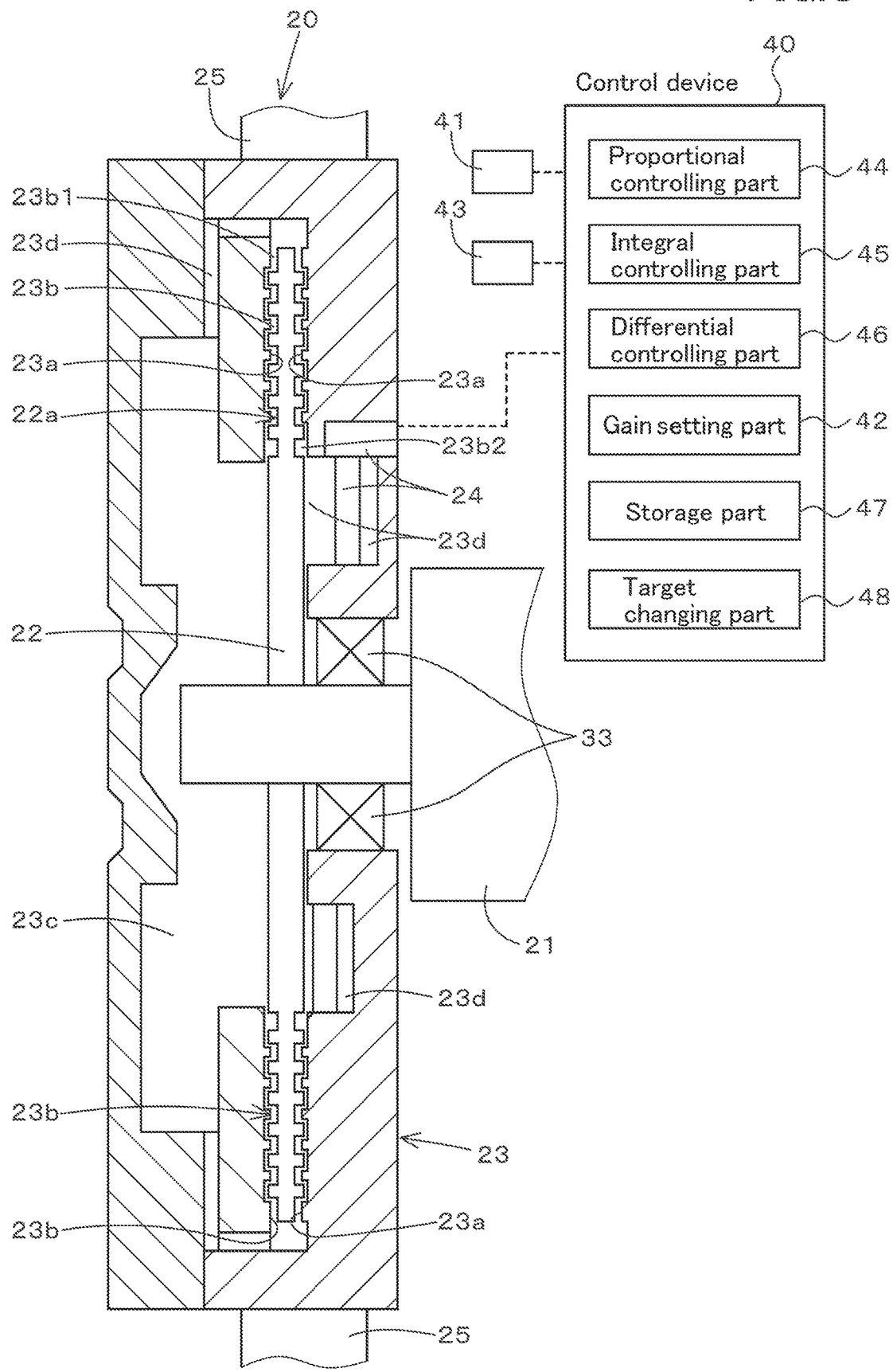
FIG. 6 is a view illustrating a cooling control system for a working machine according to an embodiment of the present invention.

FIG. 6 is an overall view of a wheel loader. To explain a working machine to begin with, the wheel loader will be taken up as an example. It should be understood that the working machine is not limited to wheel loaders, but may be a compact-track loader, a skid-steer loader, a backhoe, or other working machine.

As illustrated in FIG. 6, the wheel loader 1 is an articulated working machine, and has a machine body 2, and a working device 3 enabling front-end operations. The machine body 2 is provided with front wheels 5 and rear wheels 6. The machine body 2 is equipped with a support frame 4. The working device 3 has a lift arms 9 and a bucket 10. The lift arms 9 are supported along their basal ends on the support frame 4 to swing freely about a widthwise axial center (sideways shaft). The lift arms 9 are worked by the telescoping of lift cylinders 12.

That is, telescoping the lift cylinders 12 swings the lift arms 9 up-and-down. The bucket 10 is supported swingably about a sideways axle along the apical ends of the lift arms 9. The bucket 10 is pivoted up-and-down by the telescoping of a bucket cylinder 13. Here, in that the bucket 10 is provided to be detachable/reattachable, instead of the bucket 10, spare attachments such as a sweeper, a mower, or a breaker/hammer are installable along the apical ends of the lift arms 9.

The machine body to is provided with an operator seat 14, a steering wheel 16, and an operation device 17 for manipulating the working device 3, and a prime mover 18. The prime mover 18 is a diesel engine (engine). It should be understood that the prime mover 18 may be an electric motor or may be constituted from both an electric motor and an engine. The wheel loader 1 is equipped with a hydraulic pump that works under the rotational power of an output shaft 19 of the prime mover 18.

The hydraulic pump is enabled for supplying working fluid to the hydraulic actuators (lift cylinder 12, bucket cylinder 13, etc.) fitted to the wheel loader 1, and to the hydraulic actuator for an attachment fitted on instead of the bucket 10. Also, the wheel loader 1 is provided with a running device such as a hydrostatic transmission (HST).

Next, a working machine cooling control system that the wheel loader 1 is furnished with will be explained.

Figure 2:
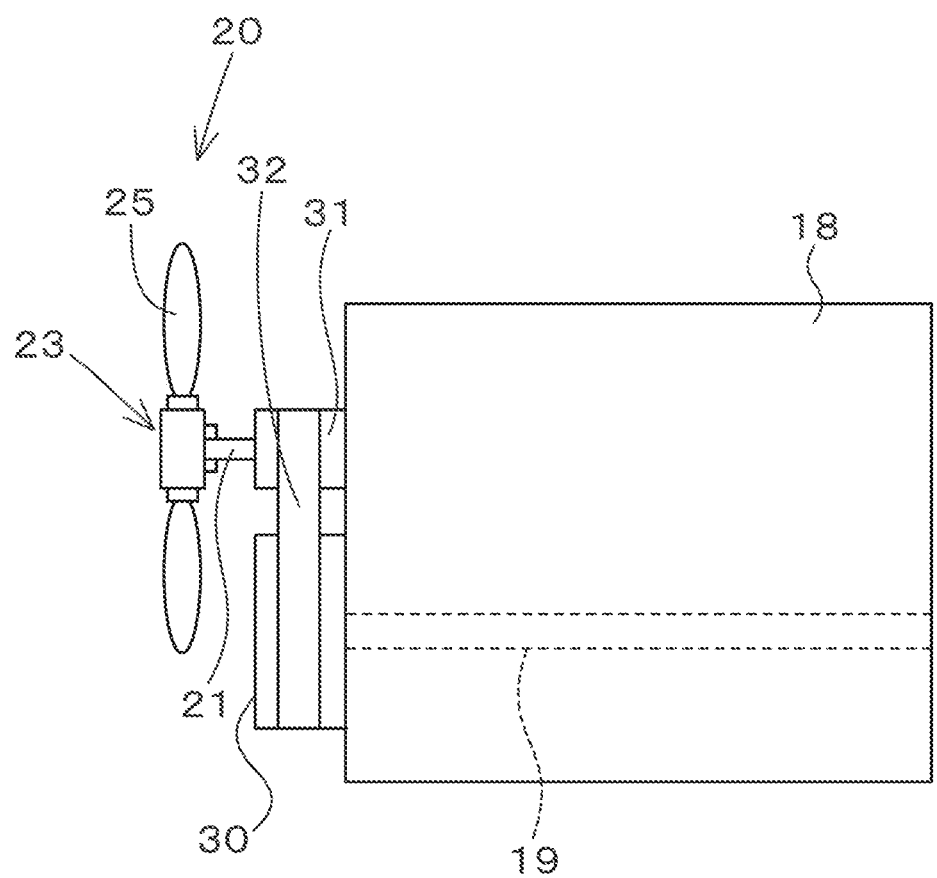
FIG. 2 is a view illustrating a relationship between an engine and a cooling device.

The working machine cooling control system, as illustrated in FIG. 1 and FIG. 2, is furnished with a cooling device 20. The cooling device 20, a device that drives with the prime mover 18 as its power source, is a viscous fan clutch employing a viscous fluid. The cooling device 20 has a rotation shaft 21, a rotor 22, a housing (case) 23, a fluid setting part (fluid-setting device) 24, and a fan 25.

The rotation shaft 21 is a shaft that rotates under rotational power from the output shaft 19 of the engine 18. A pulley 30, for example, that rotates together with the output shaft 19 of the engine 18 is provided on the output shaft 19. Likewise, a pulley 31 that rotates together with the rotation shaft 21 is provided the rotation shaft 21. A belt (drive belt) 32 is stretched over the pulley 30 and the pulley 31, wherein the rotational power of the pulley 30 is transmitted to the pulley 31 via the drive belt 32. Thus, the rotation shaft 21 rotates under the rotational power of the output shaft 19 of the engine 18.

The rotor 22 is fixed to the rotation shaft 21, wherein it rotates together with the rotation shaft 21. The rotor 22 is discoid, and a circular labyrinth part (groove section) 22a is formed in its outer faces. The rotor 22 is accommodated in a housing 23.

The housing 23 is rotatably supported on the rotation shaft 21 via a bearing 33. Along the outer side of the housing 23, a fan 25 having a plurality of blades is fitted. Accordingly, the fan 25 can be rotated by the housing 23 being rotated.

The housing 23 has wall portions 23a adjoining the labyrinth part 22a of the rotor 22. Between the wall portions 23a of the housing 23, and the labyrinth part 22a of the rotor 22, a gap (operational gap) 23b is formed. By introducing a viscous fluid (for example, silicone oil) into the gap 23b, the rotational power of the rotor 22 is transmitted to the housing 23. The housing 23 is rotated by the rotational power of the rotor 22.

The housing 23 as a reservoir chamber 23c and a flow path 23d. The reservoir chamber 23c, a chamber for temporarily storing the silicone oil, is provided along the tip end of the rotation shaft 21. The flow path 23d is a circulatory flow channel that communicates the reservoir chamber 23c with the gap 23b. Thus, the flow path 23d is a flow channel joining an outlet side 23b1 of the gap 23b with the reservoir chamber 23c and joining an inlet side 23b2 of the gap 23b with the reservoir chamber 23c.

Accordingly, the silicone oil introduced into the gap 23b, after passing through the flow path 23d and entering the reservoir chamber 23c, is able to enter the flow path 23d from the reservoir chamber 23c and return to the gap 23b.

The fluid setting part (fluid-setting device) 24 is a device for determining an injection quantity of silicone oil that is introduced into the gap 23b. The fluid setting device 24 is an electromagnetic valve enabled for closing off a midway portion of the flow path 23d. Specifically, the fluid setting part 24 has a coil (solenoid) a pin that is shiftable under magnetic excitation from the coil, and a valve body provided on a tip end of the pin.

The pin and the valve body of the fluid setting device 24 are provided within the flow path 23d, wherein the shifting of the pin enables either opening up or closing off the interior of the flow path 23d. Operating the fluid setting part 24 to change its opening degree makes it possible to adjust the injection quantity introduced from the reservoir chamber 23c and passing through the fluid-setting device 24 and into the gap 23b.

The silicone oil having entered the gap 23b passes through the flow path 23d, entering the reservoir chamber 23c. Herein, in a state in which the flow path 23d is completely closed off by the fluid setting part 24, the silicone oil cannot flow from the reservoir chamber 23 into the gap 23b. Opening the valve body of the fluid setting part 24 enables the silicone oil in the reservoir chamber 23c to pass through the fluid setting part 24 and flow into the gap 23b.

The rpm of the fan 25 (housing 23) can be changed by means of the injection quantity of the silicone oil introduced into the gap 23b.

For example, making the silicone-oil injection quantity into the gap 23b large, makes it possible to raise the true rpm (actual rotation speed) of the fan 25 until it approximately coincides with the true rpm (actual rotation speed) of the engine 18. Likewise, lessening the silicone-oil injection quantity into the gap 23b lessens the torque transmitted from the output shaft 19 of the engine 18 to the housing 23 via the rotor 22. Thus, lessening the silicone-oil injection quantity into the gap 23b reduces the ratio of the actual rotation speed of the fan 25 to the actual revolution speed of the engine 18.

Control of the cooling device 20 is carried out by a control device 40 configured by a CPU, etc. The control device 40 outputs a control signal to the fluid-setting device 24 to change the opening degree of the fluid-setting device 24 and thereby control the rpm of the fan 25. Thus, the control device 40 controls the fluid-setting device 24 so that the target rotation speed of the fan 25 matches the actual rotation speed of the fan 25.

Meanwhile, as indicated in FIG. 1, the control device 40 is furnished with a first detection device (prime mover revolutions detection device) 41, a second detection device 43, a proportional controlling part 44, and integral controlling part 45, and a differential controlling part 46. The first detection device 41 is a device that detects the true rpm (actual revolution speed) of the engine 18.

Thus, the first detection device 41 is provided in proximity to the output shaft 19, where it detects the actual rotation speed of the output shaft 19 of the engine 18. The second detection device 43 is a device for detecting the actual rotation speed of the fan 25 (housing 23). Thus, it is provided in the vicinity of either the fan 25 or the housing 23, where it detects the actual rotation speed of the fan 25.

Figure 5:
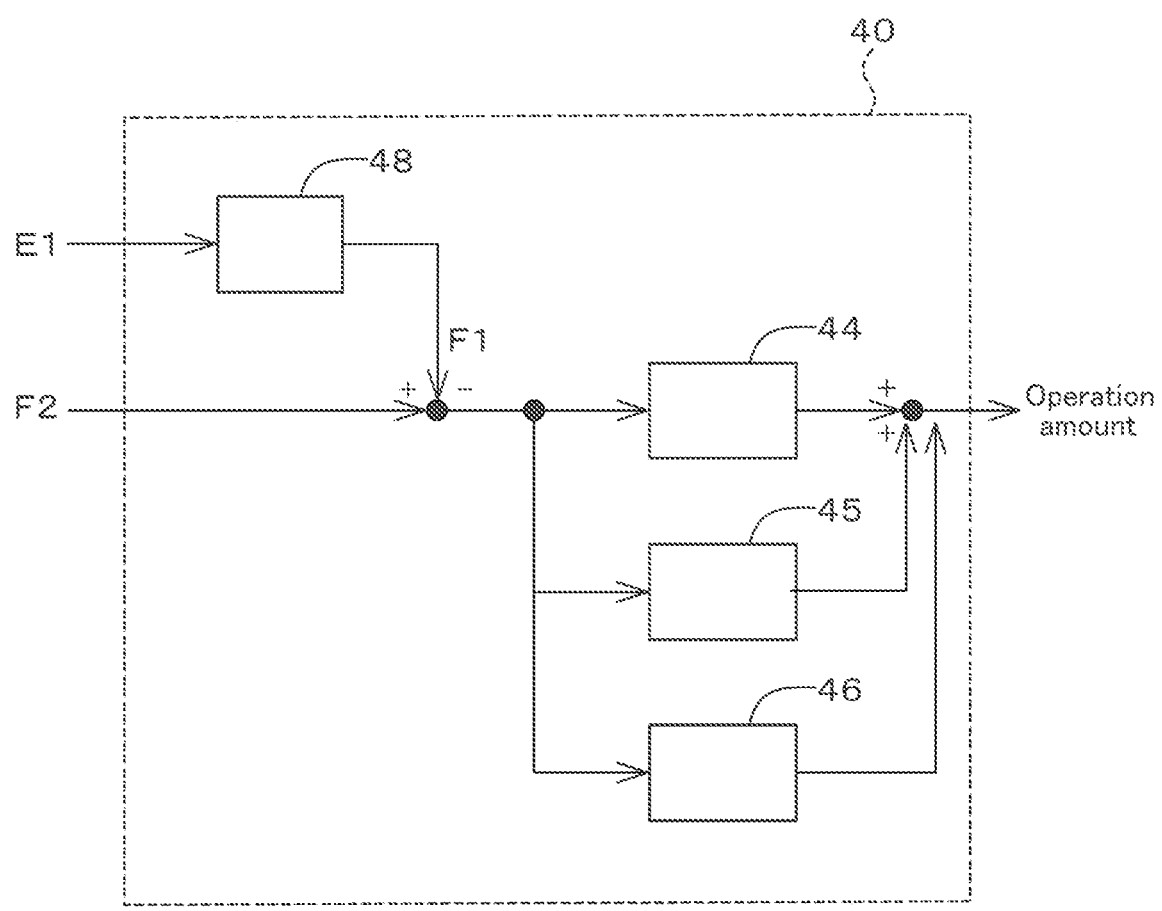
FIG. 5 is a view presenting a control block diagram.

The proportional controlling part 44, the integral controlling part 45, and the differential controlling part 46 are configured from electric/electronic components constituting the control device 40, and from a program or the like incorporated into the control device 40. FIG. 5 represents control blocks for the control device 40. Based on FIG. 5, an explanation of the proportional controlling part 44, the integral controlling part 45, and the differential controlling part 46 will be made.

As indicated in FIG. 5, the control device 40 finds the difference (F1−F2) between the actual rotation speed of the fan (F2), detected by the second detection device 43, and the target rotation speed of the fan (F1). The proportional controlling part 44 carries out proportional control (P control) by (finding the product of) multiplying the difference (F1−F2) between the fan actual rotation speed F2 and the fan target rotation speed F1 by a set proportional gain that is determined in advance.

The integral controlling part 45 carries out integral control (1 control) by (finding the product of) multiplying the difference (F1−F2) between the fan actual rotation speed F2 and the fan target rotation speed F1 by an integral gain (0 or a positive constant B) according to which an integration start-timing change process is executed and established.

The differential controlling part 46 carries out differential control (D control) by (finding the product of) multiplying the difference (F1−F2) between the fan actual rotation speed F2 and the fan target rotation speed F1 by a set differential gain that is determined in advance.

In this way, the control device 40, by means of PID control, decides a control value (actuating quantity), and by outputting to the coil in the fluid-setting device 24 a control signal that corresponds to the control value, it determines the fan rpm. Here, the control signal is a signal whereby a duty ratio in accordance with the control value is established, wherein the control device 40 sets the opening degree of the fluid-setting device 24 by means of PWM control.

Meanwhile, in PID control, when a control process containing at least integral control (I control) is executed, in some cases integral components (I components), computed by calculating the integral of P components that are the difference (F1−F2) between fan actual rotation speeds F2 and fan target rotation speeds F1 accumulate to excess, such that the transitioning of the fan actual rotation speed F2 becomes unstable.

Thus, with the PID control system destabilizing due to accumulating of excess integral components, when the fan target rotation speed F1 is changed the fan actual rotation speed F2 would give rise to overshoot. As a consequence, the time for the fan actual rotation speed F2 to conform to the fan target rotation speed F1 can grow prolonged, or noise (howling noise) due to oscillations of the fan actual rotation speed F2 can sometimes occur.

On that account, the integral controlling part 45 does not carry out integral control in cases where the difference is at or above a threshold, and commences integral control in cases where the difference is under the threshold value.

For instance, in a case where the absolute value of the difference between the fan target rotation speed F1 and the fan actual rotation speed F2 is greater than a predetermined threshold value A, the integral controlling part 45 for example zeroes the control gain that is utilized in the above processes, without employing the integral gain, which is stored in advance in a storage part 47, thereby essentially not executing integral control.

And in a case where the absolute value of the difference between the fan target rotation speed F1 and the fan actual rotation speed F2 is less than the predetermined threshold value A, the integral controlling part 45 executes integral control according to an integral gain stored in the advance storage part 47.

This means that during an overshoot, even if an attempt is made to rapidly raise the fan target rotation speed F1, because the absolute value of the difference between the fan target rotation speed F1 and the fan actual rotation speed F2 is judged to be larger than the threshold value A, such that integral control is not executed, the integral components (I components) can be prevented from accumulating in excess. The result is that the occurrence of howling and like noises in the fan can be prevented.

Figure 4:
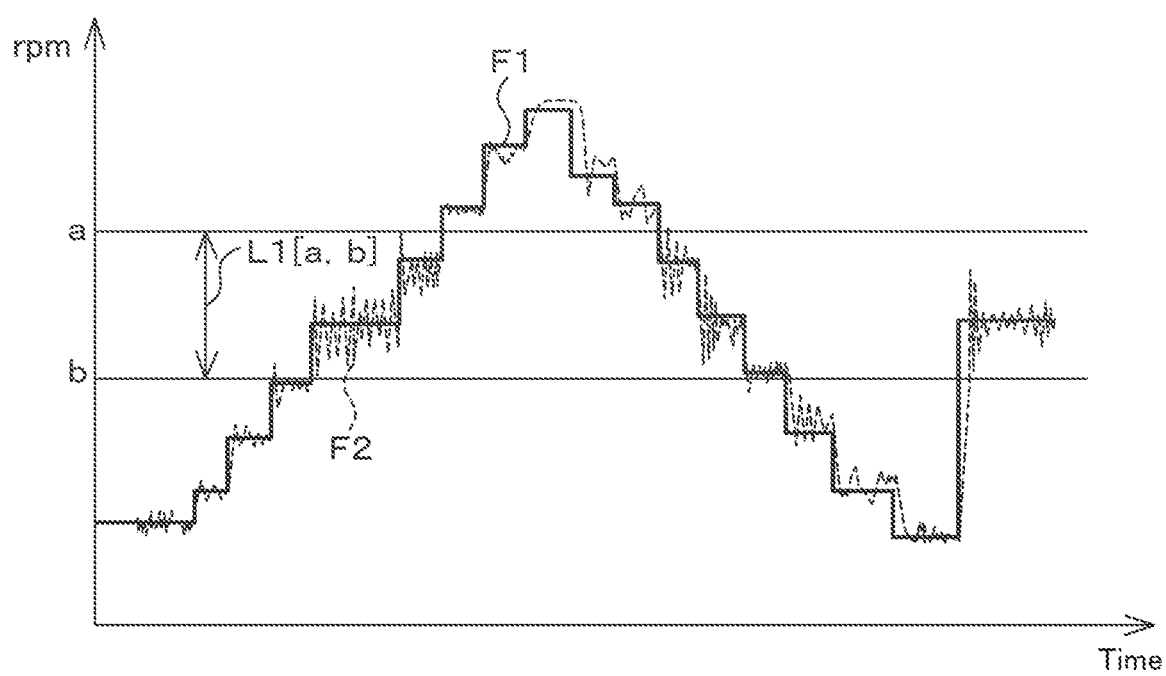
FIG. 4 is a view representing a fan instability region in a cooling control system.

Meanwhile, FIG. 4 represents variation over time in the fan actual rotation speed F2 versus fan target rotation speed F1 in a case where conventional PID control is executed in a cooling control system. Although the fan target rotation speed F1 is changed in response to oil temperature, water temperature, air-conditioning usage yes/no, etc., as indicated in FIG. 4, in a given area L the fan actual rotation speed F2 ends up oscillating at times.

Thus, an instability area (region) L where the fan actual rotation speed F2 oscillates is present. The control device 40, in a PID control process containing at least integral control (I control) carries out a process (instability-interval averting process) that improves the responsiveness and stability of the fan actual rotation speed F2 during change of the fan target rotation speed F1.

Below, the instability-interval averting process will be explained in detail.

The storage part 47 of the control device 40 stores a first range that is an instability area L1 in fan target rotation speeds F1. The instability area L1 is a range found by varying the fan target rotation speed F1 from the minimum to the maximum and measuring the behavior of the fan actual rotation speed F2.

The control device 40 is furnished with a target changing part 48; the target changing part 48 is configured from electric/electronic components constituting the control device 40, and from a program or the like incorporated into the control device 40.

The target changing part 48, in cases where the fan target rotation speed F1 is within the first range L1 stored in the storage part 47, changes the fan target rotation speed F1 to a value outside the first range L1. As indicated in FIG. 4, the target changing part 48, in cases where the fan target rotation speed F1 has fallen within a range [a, b] (a, b both positive constants) between the upper limit a and lower limit b of the first range L1, changes the fan target rotation speed F1 to a value outside the first range.

The target changing part 48 refers to an area [a, b] for fan target rotation speeds F1 stored in the storage part 47, and in cases where a fan target rotation speed F1 is included in the area [a, b], adds a predetermined setting value c to the upper limit a (a+c) and sets the addition figure as the fan target rotation speed F1.

Alternatively, the target changing part 48 refers to the area [a, b] for fan target rotation speeds F1, and in cases where a fan target rotation speed F1 is included in the area [a, b], subtracts the setting value c from the lower limit b (b−c), and sets the subtraction value (first subtraction value) as the fan target rotation speed F1. The positive setting value c added to the upper limit a, and the positive setting value c subtracted from the lower limit b may be different values. In this embodying mode, the setting value c is 50 rpm, but is not limited to that.

And for cases where the target changing part 48 refers to the area [a, b] for fan target rotation speeds F1 stored in the storage part 47 and a fan target rotation speed F1 is not included in the area [a, b], it sets the fan target rotation speed F1 as-is unchanged.

It should be understood that in cases where a fan target rotation speed F1 that has been changed by the target changing part 48 exceeds the maximum rpm, or is under the minimum rpm, of the fan in the cooling device 20, the fan target rotation speed F1 is fixed at the maximum rpm or the minimum rpm, or otherwise changing of the fan target rotation speed F1 by the target changing part 48 is temporarily not executed.

In the embodying mode described above, averting excess accumulating of I components, and averting of instability areas of the fan target rotation speeds are carried out; however, in addition to this, the response-bettering process presented below may be carried out.

The target changing part 48 ahead of time puts the fan target rotation speed F1 lower than the engine actual revolution speed E1, thereby improving the responsiveness of the fan actual rotation speed F2 when the fan target rotation speed F1 is changed. Specifically, by setting as the fan target rotation speed F1 a subtraction value (second subtraction value) that is a prescribed rpm subtracted from the engine actual revolution speed E1 detected in the first detection device 41, the target changing part 48 improves the responsiveness of the fan actual rotation speed F2.

In particular, the target changing part 48 sets as the fan target rotation speed a figure that is a prescribed rpm determined based on responsiveness, subtracted from the engine actual revolution speed. That is, the target changing part 48 defines: [fan target rotation speed (2nd subtraction value) F1=engine actual revolution speed E1−prescribed rpm].

Herein, "prescribed rpm," an rpm determined based on responsiveness, is an rpm that makes it possible to keep fan-clutch sticking under control (anti-sticking rpm). The prescribed rpm is a value determined from various experiments and the like, wherein making the fan target rotation speed F1 at least 150 rpm lower than the engine actual revolution speed E1 improves the responsiveness of the fan actual rotation speed when the fan target rotation speed is changed.

Figure 3A:
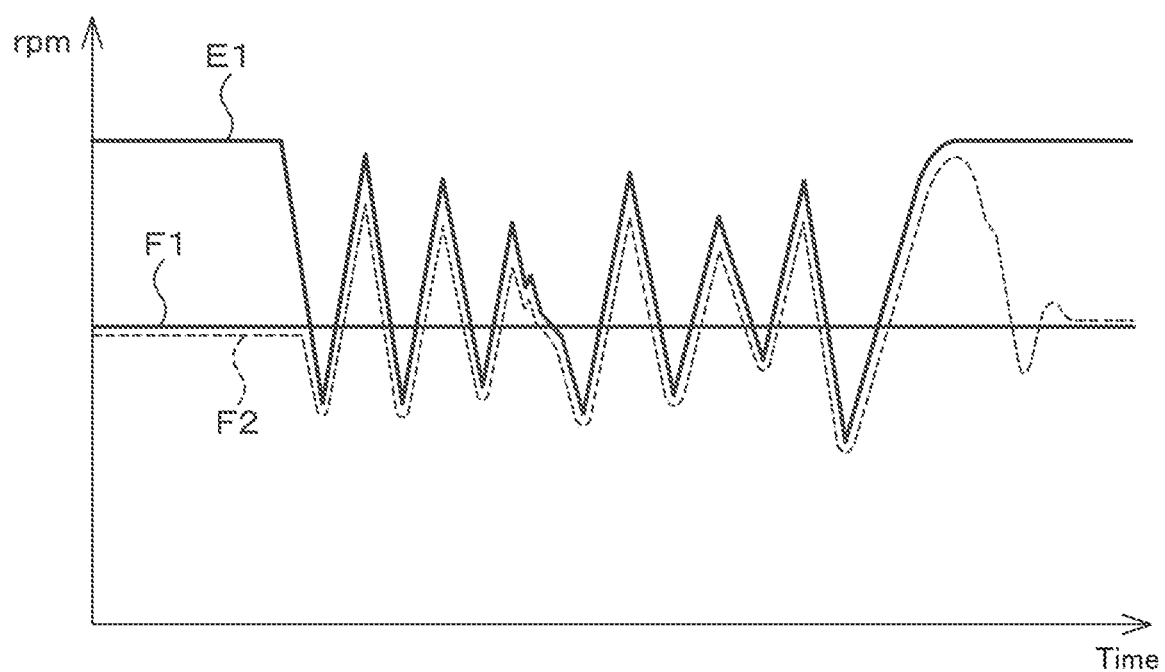
FIG. 3A is a view illustrating experimental results for a case where a process for improving fan-rpm response was not carried out.
Figure 3B:
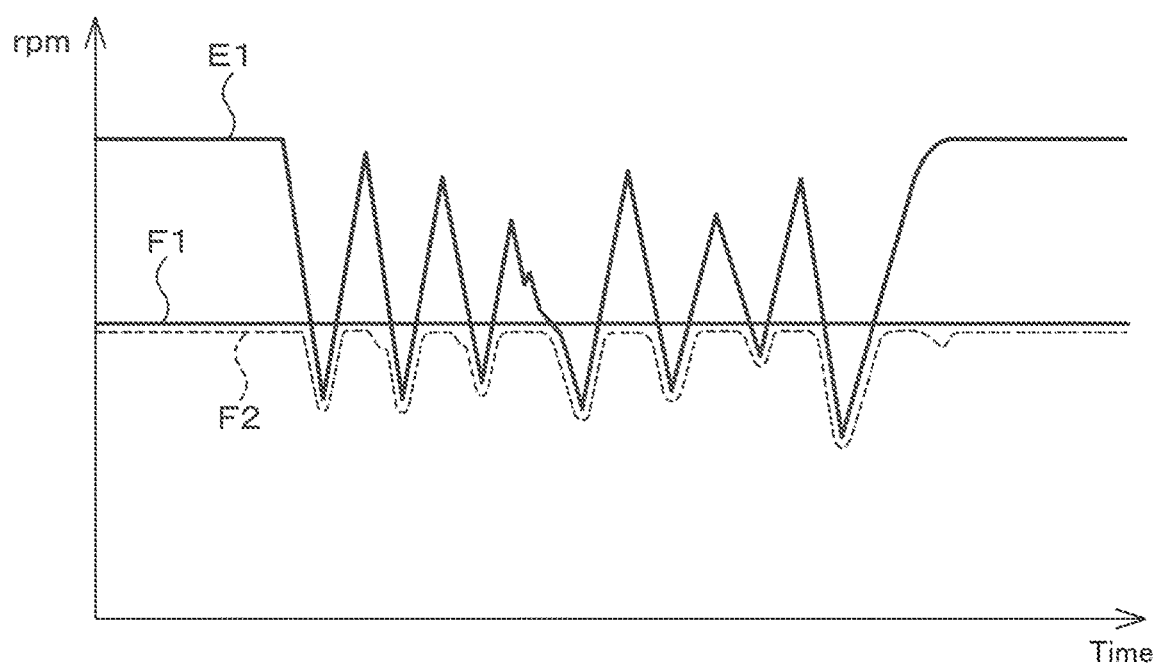
FIG. 3B is a view illustrating experimental results for a case where a process for improving fan-rpm response was carried out.

FIG. 3A and FIG. 3B make a comparison of experimental results in an instance where a process for bettering fan rpm response was carried out, and an instance where the response-bettering process was not carried out. With the experiments, the conditions for the two instances were the same. In the experiments the engine actual revolution speed was abruptly dropped, and then the engine actual revolution speed was varied over a short time period.

As indicated in FIG. 3A, in the instance where the response-bettering process was not carried out, the fan actual rotation speed F2 ends up closely tracking the engine actual revolution speed E1. And where the fan actual rotation speed reached proximate to the fan target rotation speed F1, hunting occurred.

On the other hand, as indicated in FIG. 3B, in the instance where the response-bettering process was carried out, there was no close tracking of the engine actual revolution speed E1 by the fan actual rotation speed F2, wherein the fan actual rotation speed F2 approximately matched the fan target rotation speed F1 and there was no occurrence of hunting.

As described in the foregoing, in cases where the subtraction value that is a prescribed rpm subtracted from the engine actual revolution speed E1 is made the fan target rotation speed F1, the possibility exists that that the fan target rotation speed F1 is included in the area [a, b]. The target changing part 48, in cases where the second subtraction value is within the area [a, b], subtracts a predetermined setting value d from the lower limit b in the area [a, b], and sets the subtraction-calculated value as the fan target rotation speed F1: (fan target rotation speed F1=lower-limit b−setting value d).

In accordance with the foregoing, because averting excess accumulating of I components, averting of instability areas of the fan target rotation speed, and an anti-sticking process are carried out, as such, in a cooling device 20 furnished with the rotation shaft 21, the rotor 22, the housing (case) 23, the fluid setting part (fluid setting device) 24, and the fan 25, simple changing of fan actual rotation speed to follow change in fan target rotation speed is made possible.

It should be understood that the presently disclosed embodying modes should in all respects be considered to be illustrative and not limiting. The scope of the present invention is set forth not by the foregoing description but by the scope of the patent claims, and is intended to include meanings equivalent to the scope of the patent claims and all modifications within the scope.

(Second Embodiment)

A second embodiment of the present invention, a cooling control system for a working machine and the working machine provided with the cooling control system will be described below with reference to the drawings as appropriate.

Figure 12:
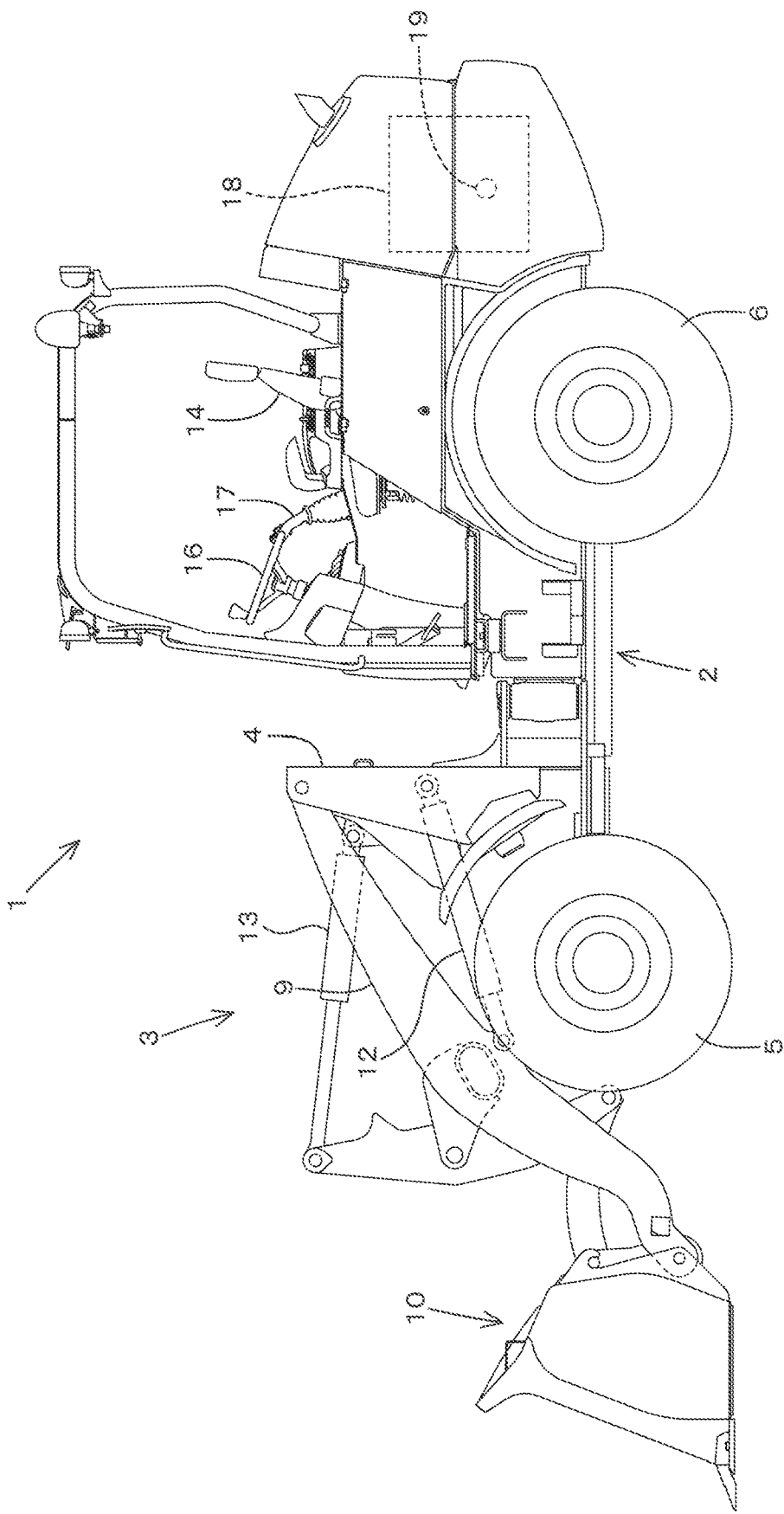
FIG. 12 is an overall view illustrating a wheel loader according to the embodiment.

FIG. 12 is an overall view of a wheel loader.

Firstly, a wheel loader will be described as an example of the working machine. The working machine is not limited to the wheel loader, and may be a compact track loader, a skid steer loader, a backhoe, or the like, or may be another working machine.

As shown in FIG. 12, the wheel loader 1 is a working machine of an articulate type, and includes a machine body 2 and a working device 3 configured to perform the working in the front. The machine body 2 is provided with a front wheel 5 and a rear wheel 6. The machine body 2 is provided with a support frame 4. The working device 3 has a lift arm 9 and a bucket 10. The base end side of the lift arm 9 is supported on the support frame 4, and is configured to be swung about an axial center (the horizontal axis) in the width direction. The lift arm 9 is actuated by the stretching and the shortening of the lift cylinder 12.

That is, when the lift cylinder 12 is stretched and shortened, the lift arm 9 is swung upward and downward. The bucket 10 is supported on the tip end side of the lift arm 9, and is configured to be swung about the horizontal axis. The bucket 10 turns in the vertical direction by the stretching and the shortening of the bucket cylinder 13. Meanwhile, the bucket 10 is provided with the detachable configuration, and in place of the bucket 10, an auxiliary attachment such as a sweeper, mower, breaker, or the like can be attached to the tip end side of the lift arm 9.

The machine body 2 is provided with an operator seat 14, a steering wheel 16, an operation device 17 used for operating the working device 3, and a prime mover 18. The prime mover 18 is a diesel engine (simply also an engine). Meanwhile, it should be noted that the prime mover 18 may be an electric motor or may be constituted of both the electric motor and the engine.

The wheel loader 1 is provided with a hydraulic pump configured to be operated by the rotational power of the output shaft 19 of the prime mover 18. The hydraulic pump is configured to supply an operation fluid to the hydraulic actuators (the lift cylinder 12, the bucket cylinder 13, and the like) installed in the wheel loader 1 and to a hydraulic actuator of an attachment mounted instead of the bucket 10. In addition, the wheel loader 1 is provided with a traveling device such as an HST (the hydrostatic transmission).

Next, the cooling control system for a working machine provided in the wheel loader 1 will be described below.

Figure 7:
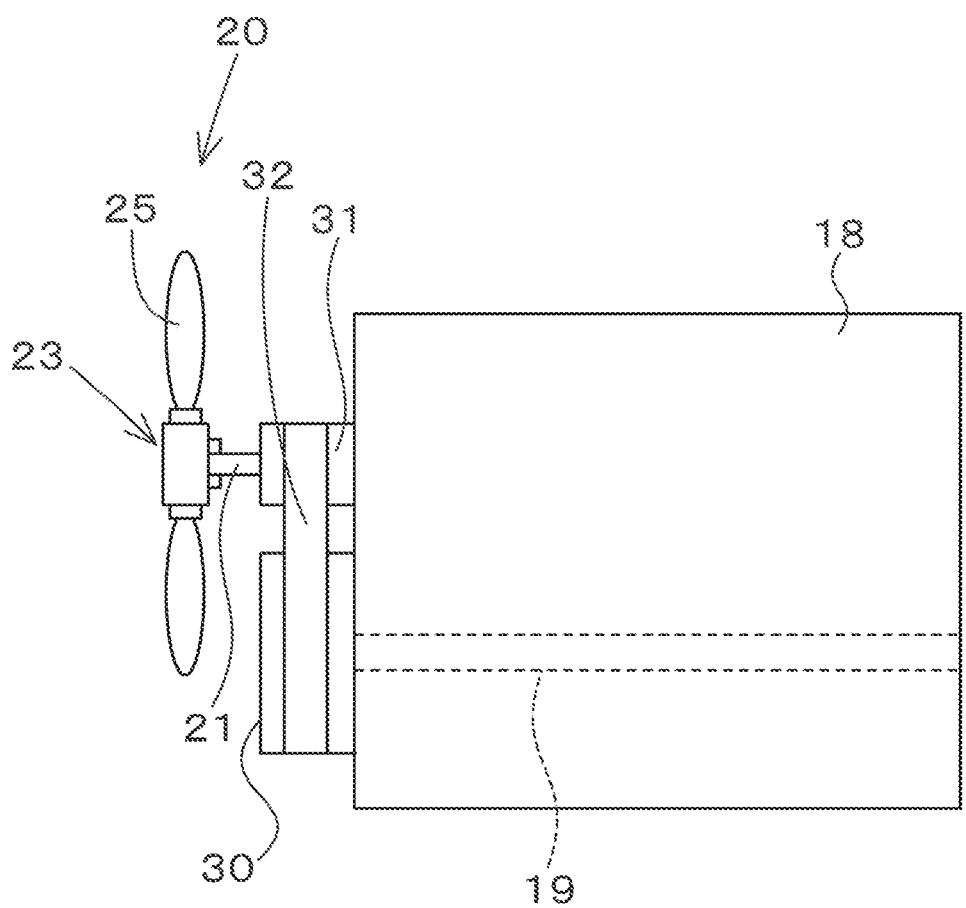
FIG. 7 is a view illustrating a relation between an engine and a cooling device according to the embodiment.

As shown in FIG. 6 and FIG. 7, the cooling control system for the working machine includes a cooling device 20. The cooling device 20 is a device configured to be driven by the prime mover 18 serving as a power source, and is a viscous type clutch fan using a viscous fluid. The cooling device 20 includes a rotation shaft 21, a rotor 22a housing (a case) 23a fluid setting part (a fluid setting device) 24, and a fan 25.

The rotation shaft 21 is a shaft configured to be rotated by the rotational power of the output shaft 19 of the engine 18. For example, a pulley 30 is provided on the output shaft 19 of the engine 18, the pulley 30 being configured to rotate together with the output shaft 19. In addition, a pulley 31 is also provided on the rotation shaft 21, the pulley 31 being configured to rotate together with the rotation shaft 21. A belt (a drive belt) 32 is hung on the pulley 30 and the pulley 31, and the rotational power of the pulley 30 is transmitted to the pulley 31 through the drive belt 32. That is, the rotation shaft 21 is rotated by the rotational power of the output shaft 19 of the engine 18.

The rotor 22 is fixed to the rotation shaft 21, and is configured to be rotated together with the rotation shaft 21. The rotor 22 is formed in the shape of disk, and a labyrinth portion (a groove portion) 22a is annularly formed on the outer surface of the rotor 22. The rotor 22 is housed in the housing 23.

The housing 23 is rotatably supported on the rotation shaft 21 by a bearing 33. On the outside of the housing 23a fan 25 having a plurality of blades is mounted. Thus, the fan 25 can be rotated when the housing 23 is rotated.

The housing 23 has a wall portion 23a close to the labyrinth portion 22a of the rotor 22a. A gap (an operation gap) 23b is formed between the wall portion 23a of the housing 23 and the labyrinth portion 22a of the rotor 22. When a viscous fluid (for example, a silicon oil) is introduced into the gap 23b, the rotational power of the rotor 22 is transmitted to the housing 23. The housing 23 is rotated by the rotational power of the rotor 22.

The housing 23 has a reservoir chamber 23c and a flow path 23d (also referred to as a flow tube 23d). The reservoir chamber 23c is a chamber for temporarily stocking (storing) the silicone oil, and is provided on the tip side of the rotation shaft 21. The flow path (flow tube) 23d is a flow path of circulation type that communicates the reservoir chamber 23c and the gap 23b with each other.

That is, the flow path 23d is a flow path connecting an outlet side 23b1 of the gap 23b to the reservoir chamber 23c and connecting an inlet side 23b2 of the gap 23b to the reservoir chamber 23c. Thus, the silicone oil introduced into the gap 23b can enter the reservoir chamber 23c after passing through the flow path 23d, then enter the flow path 23d from the reservoir chamber 23c, and then return to the gap 23b.

The fluid setting part (the fluid setting device) 24 is a device configured to set an introduction amount of the silicone oil to be introduced into the gap 23b. The fluid setting device 24 is a solenoid valve configured to close the middle portion of the flow path 23d. That is, the fluid setting device 24 has a coil (solenoid), a pin configured to be moved by magnetization of the coil, and a valve body provided at a tip end of the pin.

The pin and the valve body of the fluid setting device 24 are provided inside the flow path 23d, and the inside of the flow path 23d can be opened or closed by the movement of the pin. When the fluid setting device 24 is activated to change the degree of opening of the fluid path 23d, it is possible to adjust the introduction amount of the silicon oil to be introduced to the gap 23b through the fluid setting device 24 from the reservoir chamber 23c.

The silicone oil entering the gap 23b passes through the flow path 23d, and enters the reservoir chamber 23c. Here, in a state in which the flow path 23d is completely closed by the fluid setting section 24, the silicone oil cannot flow into the gap 23b from the reservoir chamber 23. When the valve body of the fluid setting portion 24 is opened, the silicone oil in the reservoir chamber 23c passes through the fluid setting portion 24, and can flow into the gap 23b. The rotation speed of the fan 25 (the housing 23) can be changed depending on the introduction amount of the silicon oil introduced into the gap 23b.

For example, by increasing the introduction amount of the silicon oil introduced into the gap 23b, the actual rotation speed (the actual rotation speed) of the fan 25 can be increased to be substantially the same with the actual rotation speed (the actual rotation speed) of the engine 18. In addition, by reducing the introduction amount of the silicon oil introduced into the gap 23b, the torque transmitted to the housing 23 through the rotor 22 from the rotating shaft 19 of the engine 18.

That is, by reducing the introduction amount of the silicon oil introduced into the gap 23b, the ratio of the actual rotation speed of the fan 25 to the actual rotation speed of the engine 18 is decreased.

The control of the cooling device 20 is carried out by the control device 40 constituted of a CPU or the like. The control device 40 controls the rotation speed of the fan 25 by outputting a control signal to the fluid setting device 24 to change the opening degree of the fluid setting device 24 (an aperture of the valve body).

That is, the control device 40 controls the fluid setting device 24 so that the target rotation speed of the fan 25 and the actual rotation speed of the fan 25 are matched with each other.

The control device 40 executes a processing (a gain change processing) for improving the responsiveness and the stability of the actual rotation speed of the fan at the time of changing the target rotation speed of the fan. The gain change process for improving the responsiveness and the stability will be described below in detail.

As shown in FIG. 6, the control device 40 includes a first detection device (a prime mover revolutions detection device) 41 and a gain setting part 42.

The first detection device 41 is a device configured to detect the actual revolution speed (the actual rotation speed) of the engine 18. That is, the first detection device 41 is provided in the vicinity of the output shaft 19, and is configured to detect the actual rotation speed of the output shaft 19 of the engine 18.

The gain setting part 42 is a portion configured to execute a gain change processing, and is constituted of electric/electronic parts constituting the control device 40, a program incorporated in the control device 40, and the like.

The gain setting part sets, on the basis of the actual revolution speed of the engine, at least the control gain of any one of the proportional control, the integral control, and the differential control in the PID control executed on the difference between the actual rotation speed of the fan and the target rotation speed of the fan, the PID control being executed when the target rotation speed of the fan is changed. In this manner, the responsiveness and the stability of the actual rotation speed of the fan is improved at the time of changing the target rotation speed of the fan.

FIG. 9A to FIG. 9D are diagrams showing a case where the control gain of any one of the proportional control, the integral control, the differential control is set to be constant, the control gain being a parameter of the PID control even when the actual rotation speed of the engine and the target rotation speed of the fan change in the PID control executed in the case where the target rotation speed of the fan 25 is changed.

In FIG. 9A to FIG. 9D, a reference numeral F1 is the target rotation speed of the fan, and a reference numeral F2 is the actual rotation speed of the fan. FIG. 9A to FIG. 9D show the cases in which the actual rotation speeds of the engine are different from each other and the target rotation speed F1 of the fan is different from each other.

Figure 9A:
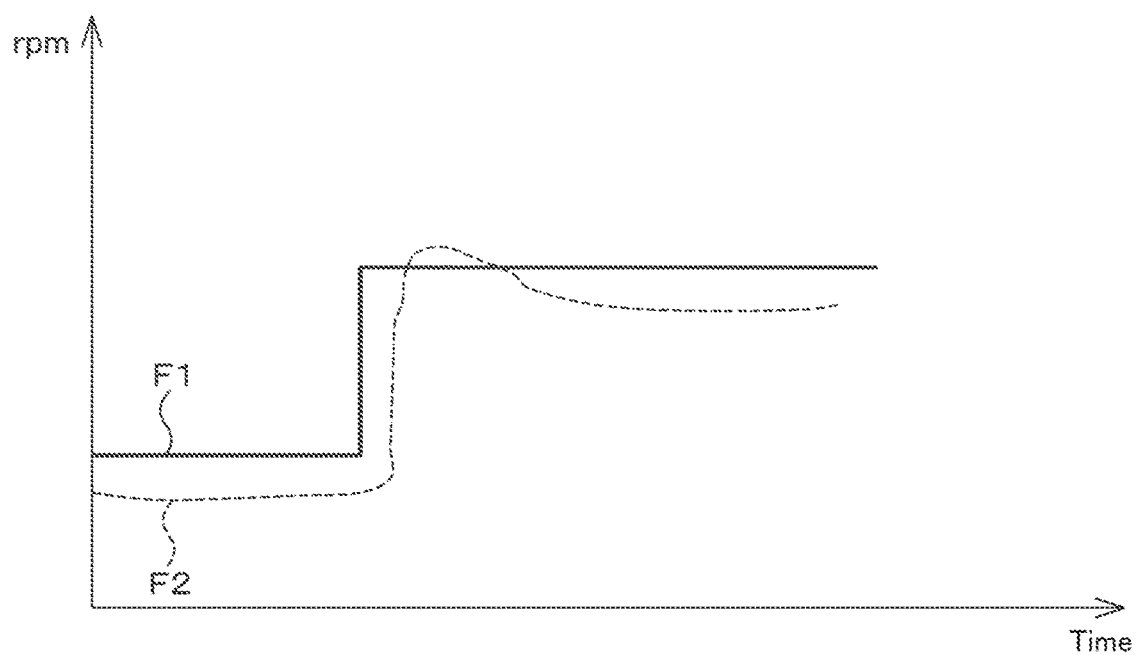
FIG. 9A is a view illustrating a first test result of a case where a gain change processing is not executed in the cooling control system according to the embodiment.

FIG. 9A shows a relation between the actual rotation speed F2 of the fan and the target rotation speed F1 of the fan of the case where the actual rotation speed is a predetermined rotational speed under the state where with the control gain of any one of the proportional control, the integral control, and the differential control is set to be constant.

Figure 9B:
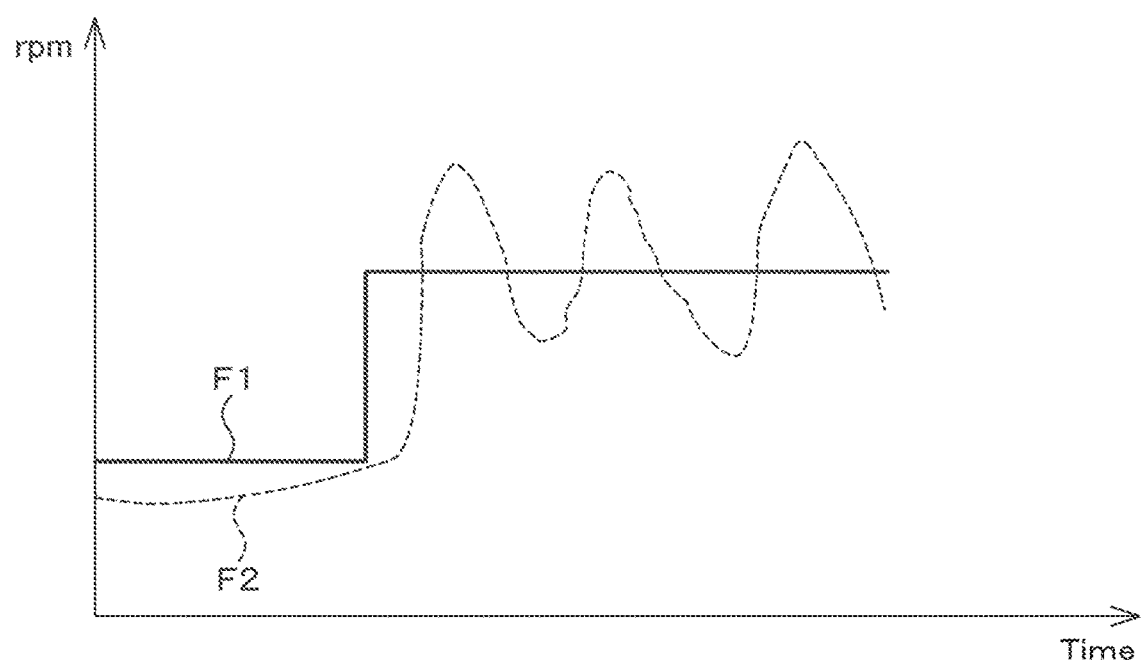
FIG. 9B is a view illustrating a second test result of the case where the gain change processing is not executed in the cooling control system according to the embodiment.
Figure 9C:
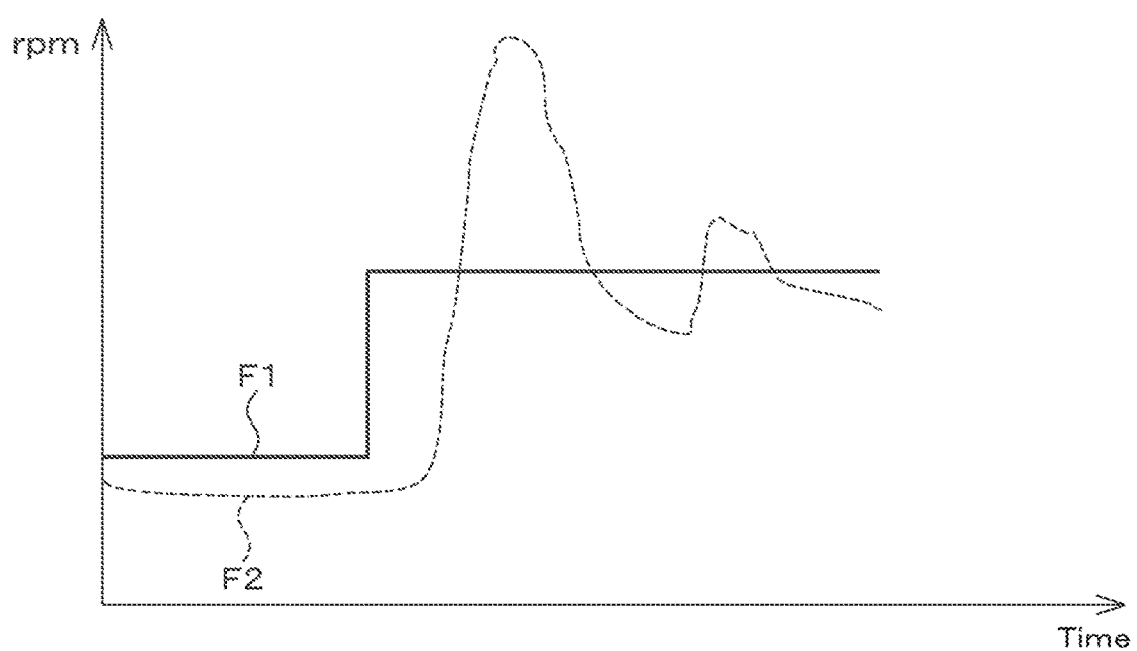
FIG. 9C is a view illustrating a third test result of the case where the gain change processing is not executed in the cooling control system according to the embodiment.
Figure 9D:
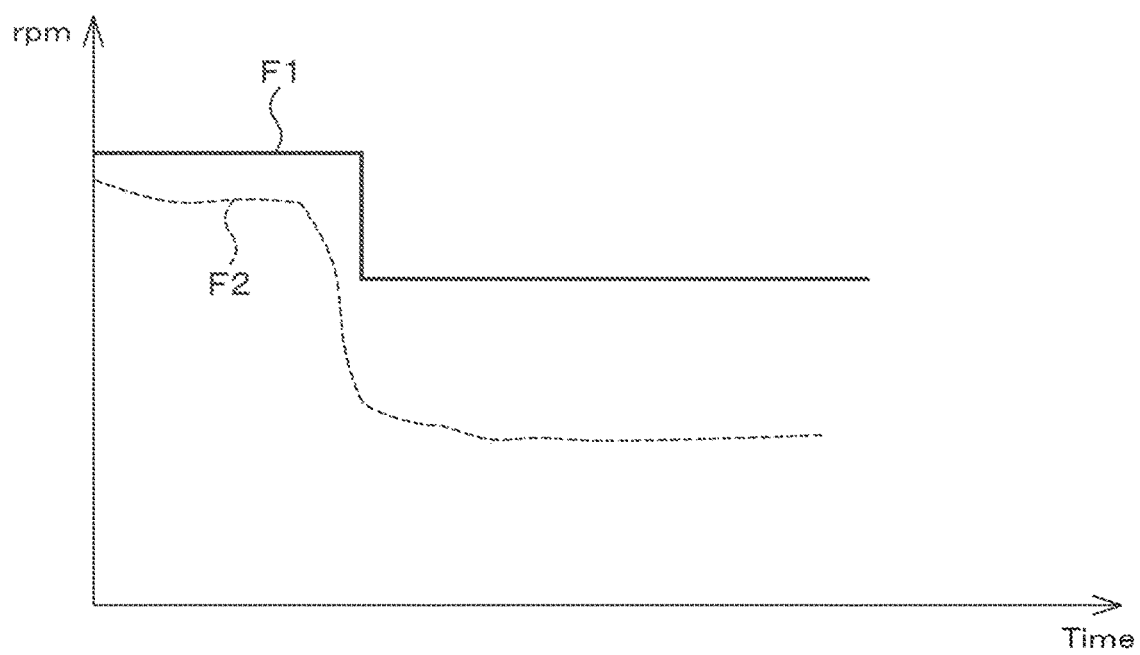
FIG. 9D is a view illustrating a fourth test result of the case where the gain change processing is not executed in the cooling control system according to the embodiment.

As shown in FIG. 9A, even if the actual rotation speed F2 of the fan relatively follows the actual revolution speed of the engine in comparison with the results shown in FIG. 9B to FIG. 9D, the sound (noise) from the fan sometimes becomes large when the actual rotation speed of the engine is in a predetermined rotation speed (a specific rotation speed).

In addition, as shown in FIG. 9B and FIG. 9C, in the case where the target rotation speed F1 of the fan is increased, the actual rotation speed F2 of the fan may suddenly change after the changing of the target rotation speed F1 of the fan when the actual revolution speed of the engine is in the predetermined revolution speed (the specific revolution speed). In such a case, the actual rotation speed F2 of the fan is suddenly changed, and thus the sound generated from the fan largely fluctuates to sometimes generate a beating sound.

In addition, as shown in FIG. 9D, in the case where the target rotation speed F1 of the fan is suddenly reduced, the actual rotation speed F2 of the fan may be reduced too much greatly with respect to the target rotation speed F1 of the fan when the actual rotation speed of the engine is in a predetermined rotation speed (a specific rotation speed). In that case, the cooling effect by the fan is deteriorated, and thus the heat balance may collapse in some cases.

As described above, in the case where the target rotation speed F1 of the fan is increased or decreased when the actual rotation speed of the engine is a certain rotation speed, the followability of the actual rotation speed F2 of the fan is deteriorated with respect to the target rotation speed F1 of the fan as described above, and thus the fan noise or the like may occur due to the overshoot or the like.

Meanwhile, it should be noted that the predetermined rotation speeds (the specific rotation speeds) explained in FIG. 9A to FIG. 9D are various rotation speeds, and the identical phenomenon described above may occur at the same rotation speed or at different rotation speeds.

The gain setting part 42 sets the control gain (the control gain of at least one of the proportional control, the integral control, and the differential control) that is preliminarily determined so as to suppress at least the overshoot, with reference to the actual revolution speed of the engine. In particular, as shown in FIG. 6, the control device 40 includes a nonvolatile storage part 47.

A setting table (a gain map) in which the actual revolution speed of the prime mover and the control gain are associated with each other is stored in the storage part 47. For example, as shown in FIG. 11A to FIG. 11C, the setting table (the gain map) includes a proportional gain map, an integral gain map, and a differential gain map.

In the proportional gain map shown in FIG. 11A, the control gains (PAa, PBa, . . . , PHc) respectively associated with the symbols "a", "b" and "c" indicating the actual revolution speed E1 of the engine and the symbols "A", "B", "C", "D", "E", "F", "G", and "H" indicating the target rotation speed F1 of the fan are set as values for suppressing the overshoot, that is, values for suppressing the noise and the like of the fan to be a predetermined level or less.

In the integral gain map shown in FIG. 11B, the control gains (IAa, IBa, . . . , IHc) respectively associated with the actual revolution speed E1 of the engine and the target rotation speed F1 of the fan are set as values for suppressing the overshoot (values for suppressing the noise and the like of the fan to be a predetermined level or less).

In the differential gain map shown in FIG. 11C, the control gains (DAa, DBa, . . . , DHc) respectively associated with the actual revolution speed E1 of the engine and the target rotation speed F1 of the fan are set as values for suppressing the overshoot (values for suppressing the noise and the like of the fan to be a predetermined level or less).

Meanwhile, it is to be noted that the symbols "a", "b" and "c" indicating the actual revolution speed E1 of the engine and the symbols "A", "B", "C", "D", "E", "F", "G", and "H" indicating the target rotation speed F1 of the fan in each of the gain maps shown in FIG. 11A, FIG. 11B and FIG. 11C are merely symbols, and the same alphabets do not necessarily indicate the same revolution speeds in FIG. 11A, FIG. 11B and FIG. 11C, and is not limited to the revolution speeds shown in the drawings.

The gain setting part 42 extracts the control gain corresponding to the actual revolution speed of the prime mover (the engine) from the setting table (the gain map), and the control gain extracted above is applied to any one of the proportional control, the integral control, and the differential control. In addition, the gain setting part 42 sets, based on the actual revolution speed of the prime mover, the control gains at least for suppressing the overshoot.

As shown in FIG. 6, the control device 40 includes a second detection device 43, a proportional controlling part 44, an integral controlling part 45, and a differential controlling part 46. The second detection device 43 is a device configured to detect the actual rotation speed of the fan 25 (the housing 23). That is, the second detection device 43 is provided in the vicinity of the fan 25 or the housing 23, and is configured to detect the actual rotation speed of the fan 25.

Figure 10:
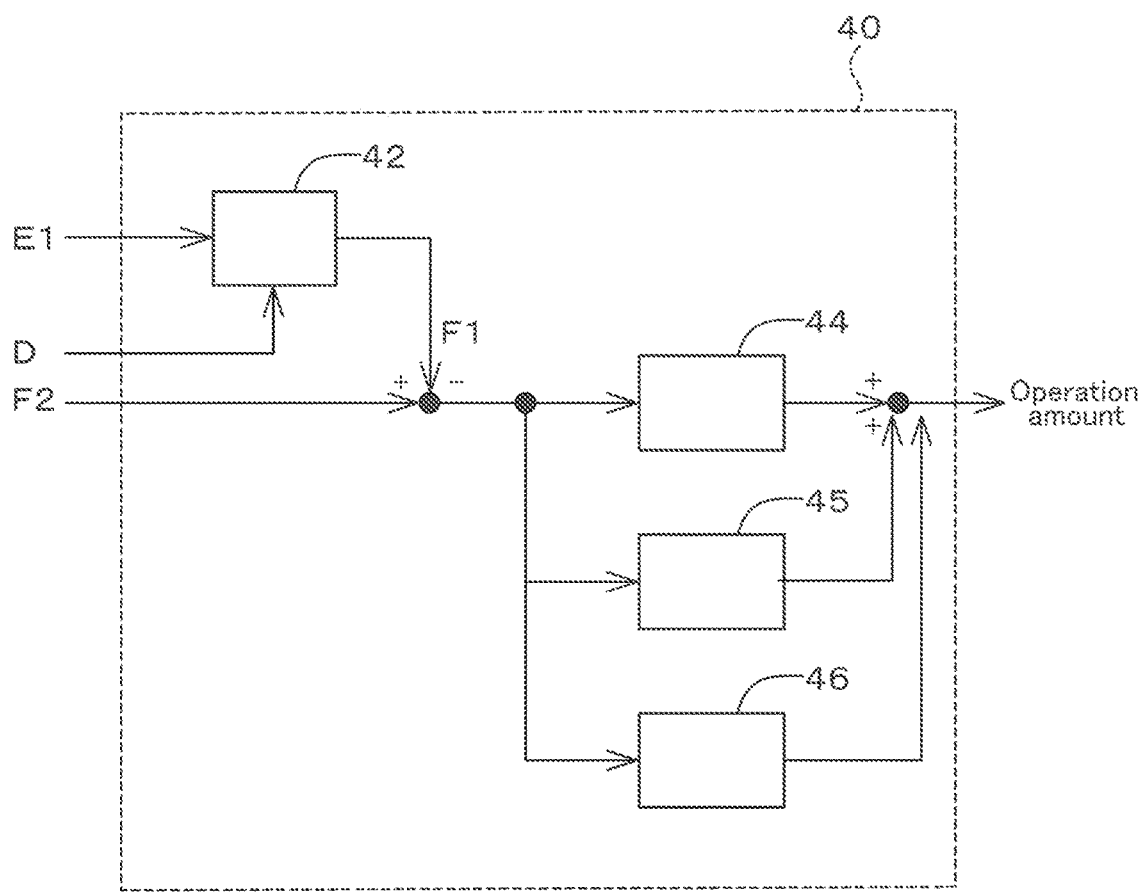
FIG. 10 is a view illustrating a control block diagram according to the embodiment.

The proportional controlling part 44, the integral controlling part 45, and the differential controlling part 46 are constituted of electric/electronic parts constituting the control device 40, programs incorporated in the control device 40, and the like. FIG. 10 shows a control block of the control device 40. With reference to FIG. 10, the proportional controlling part 44, the integral controlling part 45, and the differential controlling part 46 will be described below.

As shown in FIG. 10, with reference to the tables shown in FIG. 11A to FIG. 11C based on the actual revolution speed (E1) of the engine detected by the first detection device 41 and the target rotation speed (F1) of the fan, the gain setting part 42 of the control device 40 obtains the control gain (the control gain of at least any one of the proportional control, the integral control, and the differential control), and then executes the gain change processing. The control device 40 obtains the difference (F1−F2) between the actual rotation speed (F2) of the fan detected by the second detection device 43 and the target rotation speed (F1) of the fan.

The proportional controlling part 44 multiplies (the multiplication) the difference (F1−F2) between the actual rotation speed of the fan and the target rotation speed of the fan by the proportional gain set by the execution of the gain change processing, and thereby the proportional control (the P control) is performed.

Thus, the proportional controlling part 44 executes the P control with respect to the difference between the actual rotation speed of the fan and the target rotation speed of the fan, with use of the proportional gain set so as to make the stability and the responsiveness preferable with respect to the actual revolution speed (E1) of the engine and the target rotation speed (F1) of the fan, and thus it is possible to change the actual rotation speed of the fan up to the target rotation speed of the fan with the responsiveness and stability improved.

The integral controlling part 45 multiplies (the multiplication) the difference (F1−F2) between the actual rotation speed of the fan and the target rotation speed of the fan by the integral gain set by the execution of the gain change processing, and thereby the integral control (the I control) is performed.

Thus, the integral controlling part 45 executes the I control with respect to the difference between the actual rotation speed of the fan and the target rotation speed of the fan, with use of the integral gain set so as to make the stability and the responsiveness preferable with respect to the actual revolution speed (E1) of the engine and the target rotation speed (F1) of the fan, and thus it is possible to change the actual rotation speed of the fan up to the target rotation speed of the fan with the responsiveness and stability improved.

The differential controlling part 46 multiplies (the multiplication) the difference (F1−F2) between the actual rotation speed of the fan and the target rotation speed of the fan by the differential gain set by the execution of the gain change processing, and thereby the differential control (the D control) is performed.

Thus, the differential controlling part 46 executes the D control with respect to the difference between the actual rotation speed of the fan and the target rotation speed of the fan, with use of the differential gain set so as to make the stability and the responsiveness preferable with respect to the actual revolution speed (E1) of the engine and the target rotation speed (F1) of the fan, and thus it is possible to change the actual rotation speed of the fan up to the target rotation speed of the fan with the responsiveness and stability improved.

Further, also in the PI control, the PD control, and the PID control in which the P control, the I control, and the D control described above are appropriately combined, the feedback control is executed using the control gain set so as to make the stability and the responsiveness preferable with respect to the actual revolution speed (E1) of the engine and the target rotation speed (F1) of the fan, and thus it is possible to change the actual rotation speed of the fan up to the target rotation speed of the fan with the responsiveness and stability improved.

Next, an example of the switching of the PID control will be described below. Meanwhile, the switching of the PID control is not limited to the configuration described in the embodiment.

After the start of activating the engine 18, the control device 40 inactivates the I control and the D control until the actual revolution speed E1 of the engine reaches a predetermined revolution speed, and thus controls the fan 25 under the P control. In addition, in the case where the actual rotation speed F2 of the fan is greater than the threshold value under the condition where the PID control is performed, the threshold value being equivalent to the difference between the actual revolution speed E1 of the engine and the predetermined revolution speed which is determined in advance, the control device 40 inactivates the I control and the D control, and thus controls the fan 25 under the P control.

In addition, under the state in which the I control and the D control are inactivated and the fan is controlled under the P control, the control device 40 activates the I control and the D control to change the control into the PID control when the actual rotation speed of the fan falls to a judgment value or less (the actual rotation speed of the fan≤the judgment value).

The control device 40 determines the control value (the operation amount) under the PID control, and outputs the control signal corresponding to the control value to the coil of the fluid setting device 24, thereby setting the rotation of the fan. Meanwhile, note that the control signal is a signal in which the duty ratio is set on the basis of the control value, and the control device 40 sets the opening degree of the fluid setting device 24 under the PWM control.

As described above, the gain change processing is executed, then the fan is controlled under the feedback control, and thereby the responsiveness and the stability are improved. In addition to that, the responsiveness improvement processing may be performed.

As shown in FIG. 1, the control device 40 includes a target changing part 48. The target changing part 48 is constituted of electric/electronic parts constituting the control device 40, programs incorporated in the control device 40, and the like. The target changing part 48 preliminarily sets the target rotation speed F1 of the fan to be lower than the actual revolution speed of the engine, and thereby improves the responsiveness of the actual rotation speed F2 of the fan at the time of changing the target rotation speed F1 of the fan.

That is, the target changing part 48 sets the subtraction value to the target rotation speed F1 of the fan, the subtraction value being obtained by subtracting the predetermined rotation speed from the actual revolution number E1 of the engine, the actual revolution number E1 being calculated by the first detection device 41, thereby improving the responsiveness of the actual rotation speed F2 of the fan.

In particular, the target changing part 48 sets, to the target rotation speed of the fan, a value obtained by subtracting a predetermined rotation speed from the actual revolution speed of the engine, the predetermined rotation speed being determined on the basis of the responsiveness. In other words, the target changing part 48 sets [the target rotation speed F1 (rpm) of the fan=the actual revolution speed E1 (rpm) of the engine−the predetermined revolution speed (rpm) of the engine].

Here, the predetermined revolution speed is a revolution speed determined on the basis of the responsiveness, and is a revolution speed (a sticking prevention revolution speed) at which the sticking phenomenon can be suppressed. The predetermined revolution speed is a value determined by various experiments or the like, and at least when the target rotation number F1 of the fan is lowered by 150 rpm than the actual revolution number E1 of the engine, the responsiveness of the actual rotation speed of the fan is improved in the changing of the target rotation speed of the fan.

Figure 8A:
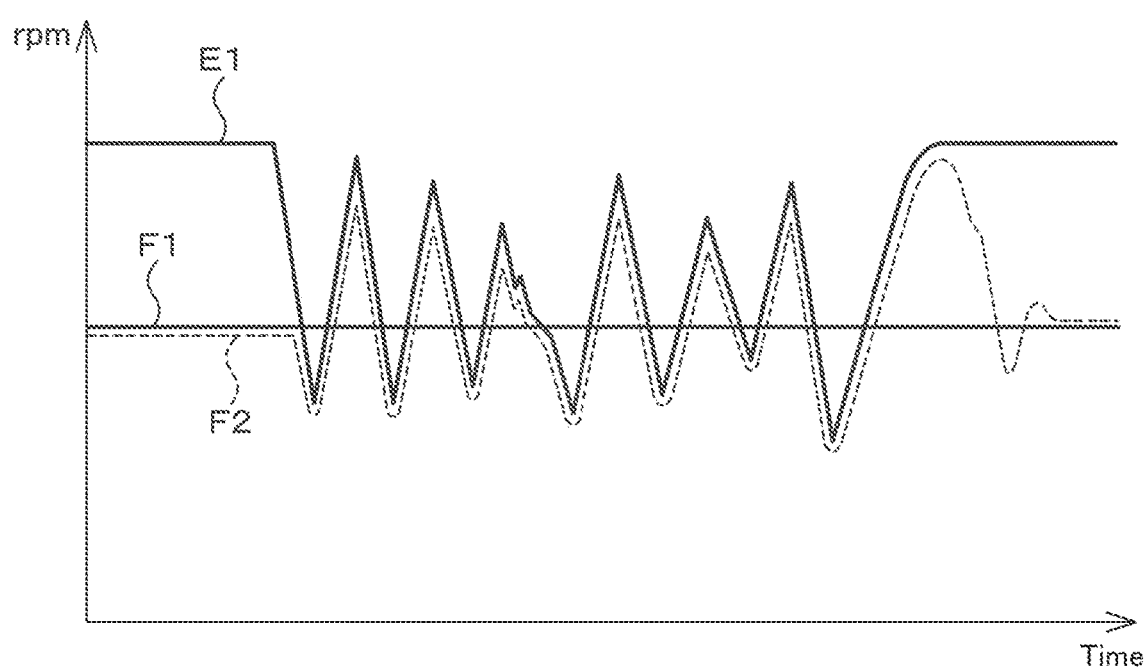
FIG. 8A is a view illustrating a test result of a case where a responsive improvement processing for a rotation speed of a fan is not executed according to the embodiment.
Figure 8B:
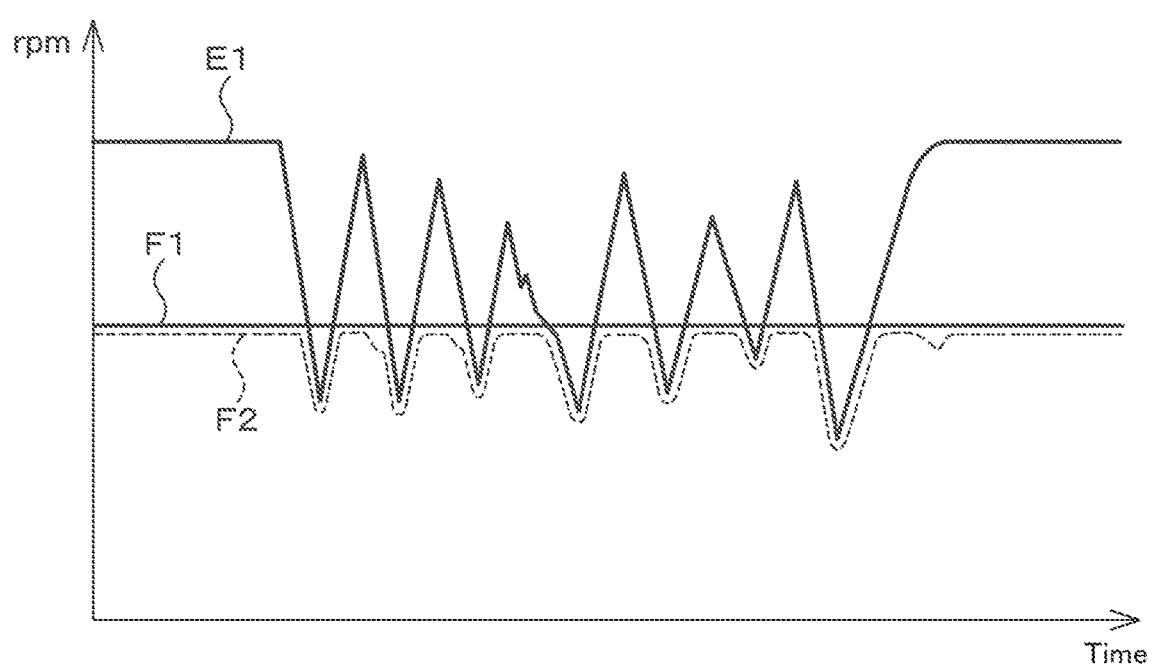
FIG. 8B is a view illustrating a test result of a case where the responsive improvement processing for the rotation speed of the fan is executed according to the embodiment.

FIG. 8A and FIG. 8B show comparison of the test results; both of the case where the responsive improvement processing of the rotation speed of the fan is performed and of the case where the responsive improvement processing of the rotation speed of the fan is not performed. The tests were carried out under the same conditions. In the tests, the actual revolution speed of the engine is suddenly decreased, and then the actual revolution speed of the engine was changed in a short time.

As shown in FIG. 8A, in the case where the responsive improvement processing is not performed, the actual rotation speed F2 of the fan followed the actual revolution speed E1 of the engine. In addition, the hunting occurred when the actual rotation speed of the fan reached near the target rotation speed F1 of the fan.

On the other hand, as shown in FIG. 8B, when the responsive improvement process is performed, the actual rotation speed F2 of the fan did not follow the actual rotation speed E1 of the engine, the actual rotation speed E1 of the fan was substantially matched with the target rotation speed of the fan, and thus no hunting occurred.

According to the above description, the vibrations and overshoot of the actual rotation speed of the fan can be reduced when the target rotation speed of the fan is changed, and thus it is possible to suppress generation of the beat sound and the like. In particular, since fine gain tuning according to the actual revolution speed of the engine and the target rotation speed of the fan becomes possible, the preferable gain of the control characteristic (the responsiveness and the stability) depending on each of the conditions (in particular, the actual revolution speed of the engine) can be easily selected, and thereby it is possible to suppress generation of the beat sound and the like.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A cooling control system for a working machine, comprising:
   a prime mover having an output shaft;
   a fan to be rotated under rotational power of the output shaft;
   a housing to which the fan is attached;
   a rotor to be rotated under rotational power of the output shaft, the rotor and the housing, under the agency of a fluid introduced into a gap formed between the rotor and the housing, rotating together;
   a fluid setting circuit to determine an injection quantity of the fluid to be introduced into the gap;
   a fan rotation detection device to detect an actual rotation speed of the fan;
   a target rotation obtaining circuit to obtain a target rotation speed of the fan;
   a proportional controlling circuit to execute proportional control with respect to a difference between the actual rotation speed and the target rotation speed;
   an integral controlling circuit to execute integral control with respect to the difference; and
   a differential controlling circuit to execute differential control with respect to the difference,
   wherein the integral controlling circuit does not execute the integral control with the difference being greater than or equal to a threshold, and executes the integral control with the difference being less than the threshold.

2. The cooling control system according to claim 1, comprising:
   a storage device to store a first range of rpms for the fan; and
   a target changing circuit to, when the target rotation speed is within the first range stored in the storage device, change the target rotation speed to a value outside the first range.

3. The cooling control system according to claim 2, wherein the target changing circuit changes the target rotation speed by adding or subtracting a predetermined setting value to or from the upper-limit value or lower-limit value of the first range.

4. The cooling control system according to claim 2, comprising:
   a driving-revolutions detection device to detect an actual revolution speed of the prime mover;
   wherein the target changing circuit sets, as the target rotation speed, a subtraction value being a prescribed rpm subtracted from the actual revolution speed detected by the driving-revolutions detection device.

5. The cooling control system according to claim 4, wherein when the subtraction value is within the first range, the target changing circuit subtracts the predetermined setting value from the lower-limit value of the first range, and sets the subtraction-calculated value as the target rotation speed.

6. A cooling control system for a working machine, comprising:
- a prime mover having an output shaft;
- a fan to rotate under rotational power of the output shaft;
- a housing on which the fan is attached;
- a rotor to rotate under rotational power of the output shaft, the rotor and the housing, under the agency of a fluid introduced into a gap formed between the rotor and the housing, rotating together;
- a fluid setting circuit to determine an introduction quantity of the fluid to be introduced into the gap;
- a fan rotation detection device to detect an actual rotation speed of the fan;
- a target rotation obtaining circuit to obtain a target rotation speed of the fan;
- a proportional controlling circuit to carry out proportional control with respect to a difference between the actual rotation speed and the target rotation speed;
- an integral control circuit to carry out integral control with respect to the difference;
- a differential control circuit to carry out differential control with respect to the difference; and
- a gain setting circuit to set a control gain for any one of the proportional control, the integral control, and the differential control, based on an actual revolution speed of the prime mover.

7. The cooling control system according to claim 6, comprising:
- a driving-revolutions detection device to detect the actual revolution speed; and
- a setting table having a relation between the control gains and the actual revolution speeds,
- wherein the gain setting circuit extracts the control gain from the setting table, the control gain corresponding to the actual revolution speed detected by the driving-revolutions detection device, and to apply, to any one of the proportional control, the integral control and the differential control, the control gain extracted from the setting table.

8. The cooling control system according to claim 6, wherein the gain setting circuit sets at least the control gain for suppressing an overshoot, based on the actual revolution speed.

9. The cooling control system according to claim 6, comprising:
- a driving-revolutions detection device to detect the actual revolution speed; and
- a target changing circuit to set a subtraction value as the target rotation, the subtraction value being obtained by subtracting a predetermined revolution speed from the actual revolution speed detected by the prime mover revolutions detection.

10. A working machine comprising the cooling control system according to claim 1.

11. A working machine comprising the cooling control system according to claim 6.

* * * * *